United States Patent [19]

Fromherz

[11] Patent Number: 5,668,942

[45] Date of Patent: Sep. 16, 1997

[54] GENERIC SYSTEM FOR DESCRIBING AND USING RESOURCES FOR PRINT ENGINE SCHEDULING

[75] Inventor: Markus P. J. Fromherz, Palo Alto, Calif.

[73] Assignee: Xerox Corporation, Stamford, Conn.

[21] Appl. No.: 472,151

[22] Filed: Jun. 7, 1995

[51] Int. Cl.[6] .................................................. G06K 15/00
[52] U.S. Cl. ............................................. 395/112; 395/101
[58] Field of Search ........................... 395/101, 112, 395/114, 650, 109, 115, 116, 117, 500, 674, 672, 670, 676, 800, 904; 364/551.01, 149, 150, 151, 468.05, 468.06, 468.01, 468.02, 468.03, 468.04, 468.08, 468.09, 468.13, 468.15, 471.01, 471.02, 578, DIG. 1, DIG. 2, 977.5; 358/296, 468; 399/9, 16–17, 27–28, 30, 364, 374, 370, 372

[56] References Cited

U.S. PATENT DOCUMENTS

| 4,991,176 | 2/1991 | Dahbura et al. | 371/27 |
|---|---|---|---|
| 5,038,307 | 8/1991 | Krishnakumar et al. | 364/578 |
| 5,056,014 | 10/1991 | Burrows | 364/200 |
| 5,095,342 | 3/1992 | Farrell et al. | 355/319 |
| 5,095,369 | 3/1992 | Ortiz et al. | 358/296 |
| 5,107,299 | 4/1992 | Farrell et al. | 358/296 |
| 5,125,098 | 6/1992 | Burrows | 395/800 |
| 5,161,115 | 11/1992 | Teshima et al. | 364/551.01 |
| 5,179,410 | 1/1993 | Farrell et al. | 355/207 |
| 5,187,587 | 2/1993 | Farrell et al. | 358/296 |
| 5,287,194 | 2/1994 | Lobiondo | 395/114 |
| 5,301,100 | 4/1994 | Wagner | 364/148 |
| 5,325,528 | 6/1994 | Klein | 395/650 |
| 5,337,135 | 8/1994 | Malachowski et al. | 355/319 |
| 5,337,258 | 8/1994 | Dennis | 364/551.01 |
| 5,363,175 | 11/1994 | Matysek | 358/208 |
| 5,408,663 | 4/1995 | Miller | 395/650 |
| 5,469,533 | 11/1995 | Dennis | 395/114 |

OTHER PUBLICATIONS

Xerox Disclosure Journal; Vol. 15, No. 5; Sep./Oct. 1990.

*Primary Examiner*—Edward L. Coles, Sr.
*Assistant Examiner*—Dov Popovici
*Attorney, Agent, or Firm*—Fay, Sharpe, Beall, Fagan, Minnich & McKee

[57] ABSTRACT

A system is provided to allow for automated scheduling and completion of print jobs in a printing machine. A generic system for describing functionality of various modules forming a print engine is described. Such a module description is provided for each of a plurality of subassemblies which form the printing machine. A component communicates description information about itself to a scheduling unit once it is integrated into a complete printing machine. The scheduling unit, in turn, analyzes all functions available from various subassemblies comprising the machine. This analysis returns data representative of all available functions to the printing machines. Upon receipt of user input on one or more printing jobs, the scheduler then correlates the user information with the available properties of the printing machine to schedule resource allocations to efficiently complete all printing tasks, taking into account dynamic, environmentally-driven allocations.

18 Claims, 4 Drawing Sheets

GENERIC SYSTEM FOR DESCRIBING AND USING RESOURCES FOR PRINT ENGINE SCHEDULING

BACKGROUND OF THE INVENTION

This is a related application to commonly owned U.S. patent application Ser. No. 08/485,848, filed Jun. 7, 1995, entitled A METHOD FOR AUTOMATICALLY DERIVING PRINT ENGINE CAPABILITIES FOR INCREMENTAL SCHEDULING FROM COMPOSITIONAL PRINT ENGINE MODELS; U.S. patent application Ser. No. 08/476,510, filed Jun. 7, 1995, entitled A SYSTEM FOR GENERICALLY DESCRIBING AND SCHEDULING OPERATION OF A MODULAR PRINTING MACHINE; U.S. patent application Ser. No. 08/485,846, filed Jun. 7, 1995, entitled A SYSTEM FOR AUTOMATICALLY CONFIGURING PRINT ENGINE SOFTWARE FROM PRINT ENGINE MODULE CAPABILITIES; U.S. patent application Ser. No. 08/486,646, filed Jun. 7, 1995, entitled A GENERIC METHOD FOR SCHEDULING PRINT ENGINES USING PRINT ENGINE CAPABILITIES; and U.S. patent application Ser. No. 08/479,003, filed Jun. 7, 1995, entitled A GENERIC METHOD FOR AUTOMATICALLY GENERATING FINITE-STATE MACHINES FOR SCHEDULING FROM PRINT ENGINE CAPABILITIES; the contents of each of which are incorporated herein by reference.

This application pertains to the art of printing machines and more particularly to photo-duplication machines such as copiers.

The invention is particularly applicable to a generic description format for describing components independently of their environment or interaction with other components. The system allows for automated scheduling of printing jobs pursuant to the capabilities associated with modular components forming a printing machine, and will be described with particular reference thereto. However, it will be appreciated that the invention has broader application, such as in providing for an automated assessment of machine capabilities in view of modular components, as well as job specific utilization in an efficient manner in view of the same.

Present day machinery, such as photocopiers, is often constructed from pre-fabricated components. Such fabrication allows for mass production of each of the subassemblies of a machine while simultaneously allowing for customization to consumer's needs. Further, a consumer is provided with a means by which he or she may alter or upgrade capabilities of an existing base unit.

Earlier systems for distributed printing and distributed job scheduling may be found in U.S. Pat. Nos. 5,287,194 and 5,363,175 commonly owned by the assignee hereof.

One concern with modular assembly of integrated units is provided with configuring and optimizing use of a completed system. While this is a concern for the manufacturer of an initial unit, it is perhaps an even greater concern to the end user. End users are often technically unsophisticated. However, they are driven by a desire for increased capability of a machine. At the same time, they would like to avoid increasing their initial investment. Consumers are also dissuaded from expenses associated with hiring a professional to upgrade or configure existing equipment.

The present invention contemplates a new and improved system for automatically ascertaining machine capability and utilizing the same which overcomes the above-referenced problems, and others, and provides a system with enhanced usability and configurability both prior to and after the machine leaves the factory.

SUMMARY OF THE INVENTION

In accordance with the present invention, there is provided a system for generically and uniquely describing capabilities of various individual modular machine components for print engine scheduling.

In accordance with another aspect of the present invention, a system is provided for integrating such generic component descriptions so as to allow for automatically recognizing a presence of one or more subassemblies and communicating their various functional descriptions to a centralized processor unit for assessment and analysis.

In accordance with another aspect of the present invention, the system provides for an environment adapted for efficient, automated scheduling of a plurality of print jobs of various or varying characteristics.

An advantage of the present invention is the provision of a printing machine model that is conducive to being easily and automatically configured to various or varying subassemblies.

Another advantage of the present invention is the provision of a printing machine that is adapted to be readily configured to maximum potential by an end-user.

Yet another advantage of the present invention is a provision of a printing machine that maximizes printing throughput by being adapted for efficiently scheduling and utilizing modular subassemblies in accordance with user-specified print jobs.

Further advantages will become apparent to one of ordinary skill in the art upon a reading and understanding of the subject specification.

BRIEF DESCRIPTION OF THE DRAWINGS

The invention may take physical form in certain parts, and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
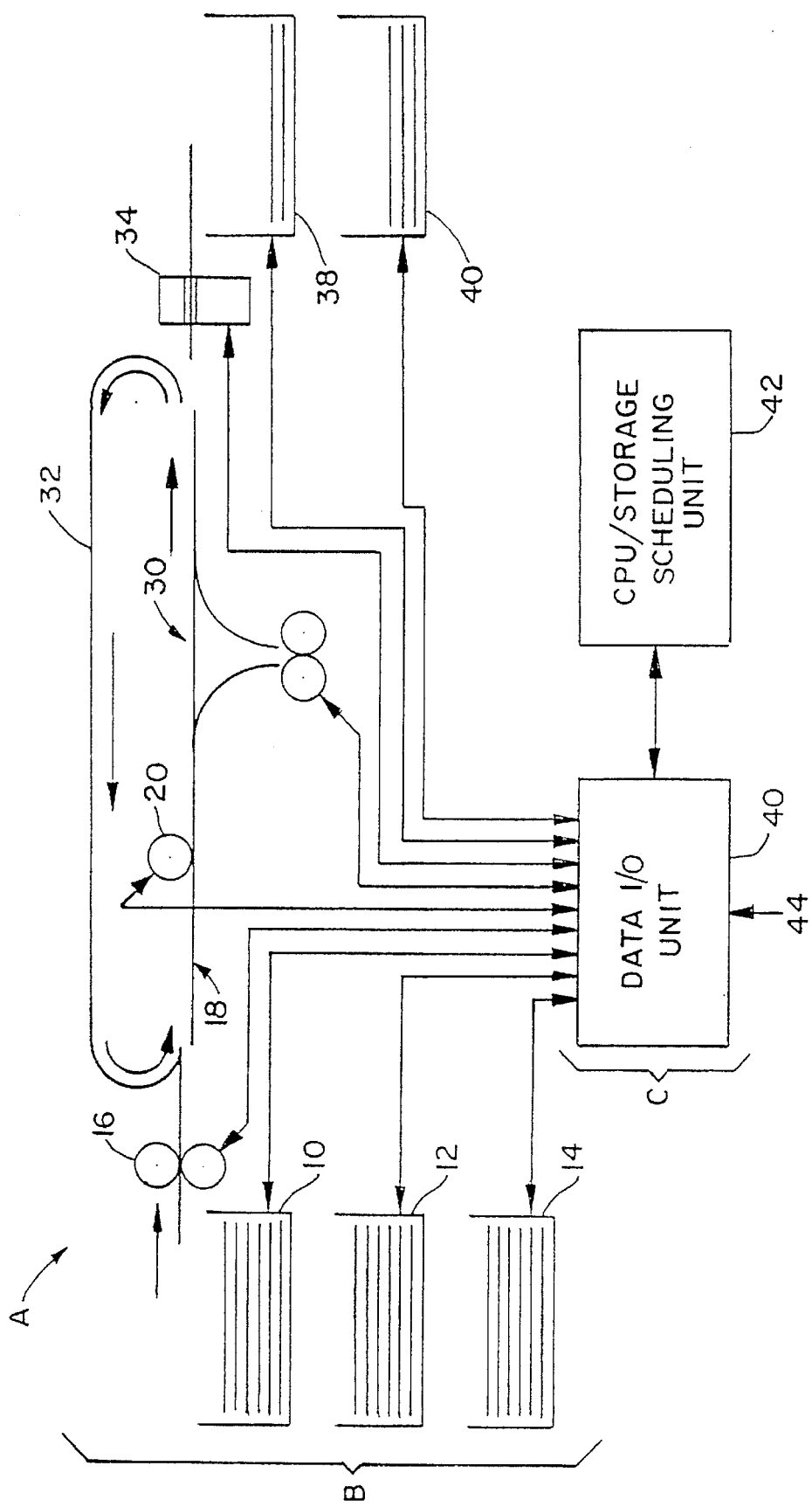
FIG. 1 provides a schematic of a representative, modular printing machine incorporating the automated configuration and scheduling of the subject invention.

Turning now to the drawings wherein the purpose is for illustrating the preferred embodiment of the invention only, and not for the purpose of limiting the same, FIG. 1 illustrates an embodiment of the subject invention having a modular print engine A which includes a plurality of modules or subassemblies B and a data-processor unit for configuration and scheduling C. As used herein "print engine" includes any reprographic machine, such as printers, copiers, facsimile machines, and the like.

As will be detailed below, various capabilities provided with each of the modules B are ascertained and correlated in the data processor unit C. Such correlated and analyzed data is further analyzed in view of user input defining a desired printer operation, or series of operations. This, in turn, is used to optimize, schedule, and control operation of the printing machine to most efficiently accomplish the series of printing tasks. The subject system is described by way of example with a copier machine. It will be appreciated that generic description, resource assessment and scheduling may be practicable on any modular, material handling system.

With the particular example of FIG. 1, the modules B are illustrated as including a plurality of paper storage bins. In the illustration, these include bins 10, 12, and 14. The plurality of bins may be representative of different paper sizes or secondary or reserved storage capability. A sheet feeder mechanism is illustrated schematically at 16. As will be appreciated by one of ordinary skill in the art, a sheet feeder such as that illustrated at 16 will function to obtain sheet stock from one or more of the bins.

The feeder 16 will feed sheet stock to a conveyor 18. The conveyor will, in turn, feed sheet stock to a print mechanism 20, the particular construction of which will be well within the understanding of one of ordinary skill in the art. Also illustrated in the figure is an inverter mechanism 30 that may selectively invert or flip sheet stock that progresses along the conveyor 18. A feedback-unit 32 is provided for returning sheet stock to the printer mechanism 20 for duplex printing thereof.

In the illustration, the conveyor 18 provides a path to a stapling mechanism 34 for selective stapling of printed documents. The final, illustrated component in the group of modules B illustrates a plurality of output bins represented by bins 38 and 40.

Turning to the data processor unit C, included therein is a data input/output ("I/O") unit 40 which is in data communication with a central processor unit ("CPU")/storage scheduling unit 42, the details of which will be described further below. A data path is provided between the data I/O unit 40 and each of the modules B.

In the preferred embodiment, each module B includes therein a description associated with various functions and capabilities thereof. The particulars of such a generic description will be detailed below. The data path between each of the illustrated modules and the data I/O unit allows for acquisition to the data processor unit C of all such description. In the preferred embodiment, any module B will communicate its associated description to the data I/O unit upon connection to the modular print engine A. This ability allows for "plug-and-play" capability of the subject system.

Data interconnections between the data I/O unit 40 of the data processor C and the various modules B also allow for controller activation thereof. Thus, the data processor unit C has ascertained from the available modules the complete set of capabilities of the modular print engine A. This information, coupled with user input 44 to the data I/O unit 40 allows for efficient scheduling of available, modular resources to accomplish a series of printing jobs by use of the available components.

Figure 2:
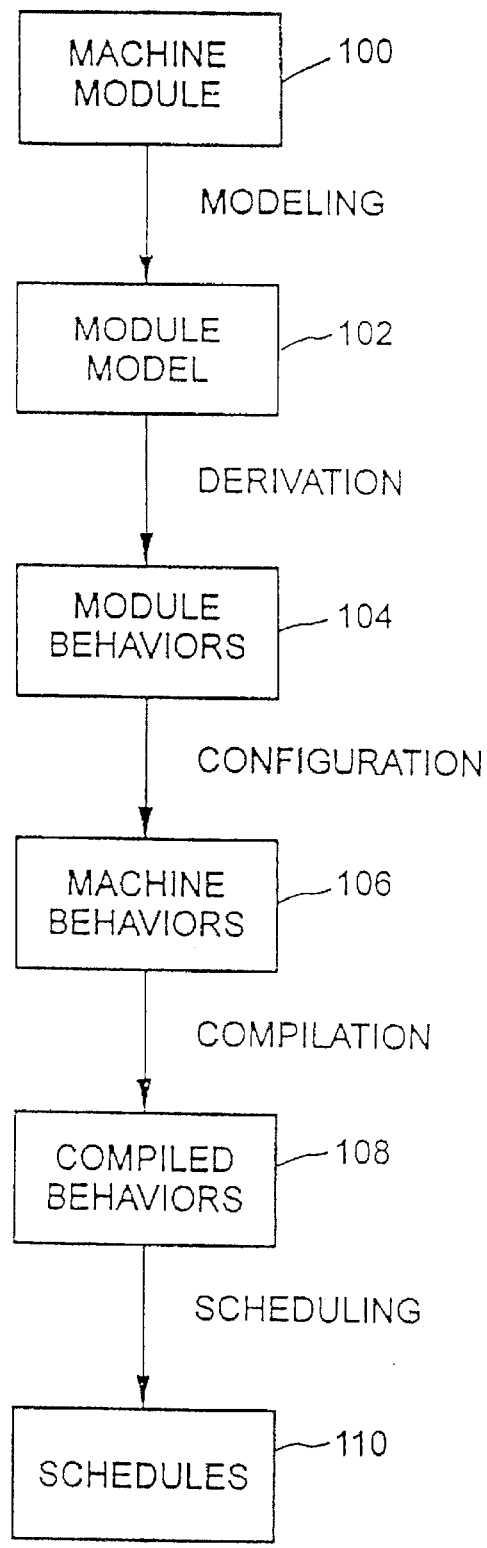
FIG. 2 provides a flow chart detailing the hierarchical ordering of operations to accomplish the configuration and scheduling of the present invention.

Turning next to FIG. 2, the basic format for generic print engine description and scheduling will be described. As alluded to earlier, past attempts for automated print engine scheduling software were based on an analysis of a complete engine configuration. The results of this analysis are required for writing of dedicated software specific to a particular configuration. Conversely, the subject system provides for separation of scheduling software into two parts. In a first part, a scheduler architecture is provided with generic algorithms. In a second part, machine-specific information is also provided in a format detailed below.

Given a document to be printed on a given print engine, a scheduler is provided which serves to identify, schedule, and initiate machine operations for producing a document. In the illustration of FIG. 1, such operations may include feeding of sheets, moving of sheets, preparation of images, transferring of images to sheets, etc. It will be appreciated that a document to be printed typically arrives incrementally (e.g., sheet-by-sheet). Scheduling and schedule execution (printing) usually happen concurrently. As a consequence, machine-specific information used by a scheduler is advantageously structured such that the scheduler is able to identify which operations will produce the required sheet. Further, the system must be aware of constraints which must be observed when scheduling operations. Additionally, the system is provided with a means by which it may send appropriate commands to the modules to allow them to accomplish their available functions.

In the diagram of FIG. 2, the particular system for preparing the machine-specific information is depicted. The system commences by using declarative descriptions (models) of printing engine modules in block 100. Such a model advantageously contains description of a module's structure and potential behavior of its components. As noted in the example of FIG. 1, possible components include feed trays, transport belts, transfer components, inverters, gates, etc. Potential behaviors may be, by way of example, either bypassing an inverter or using it to invert a sheet. The step of modeling is typically performed by an engineer using a modeling language, the details of a preferred embodiment of which will be provided below.

At block 102, a module has already been modeled by its components. Next, an automatic derivation of potential behaviors of an entire module is then fabricated from information obtained from the component models. This derivation may be performed, by way of example, by simulation or partial evaluation, and by envisionment. Simulation is commonly understood as the execution of models to mirror the execution of the real system. Partial evaluation is commonly understood as the partial execution of programs, leaving certain parts of the programs unexecuted and to be evaluated at a later time. Envisionment is commonly understood as the exploration of all potential behaviors of a system by, for example, repeatedly and in various ways exercising simulation or partial evaluation of its models. The resulting module behavior is comprised of an output produced by a particular behavior, inputs from which the output is produced, individual operations required to produce it (its "itinerary"), as well as various constraints on resources and timings to be observed when performing the operations. Some or all of this information may advantageously be precompiled. By way of example, this may be compiled to finite-state machines.

When print engine modules B (FIG. 1) are plugged together to form a new configuration, different module behaviors are collected and automatically composed via the data processor unit C to generate potential behaviors of a complete print engine A.

The afore-noted composition is also suitably enabled to occur dynamically, i.e., each time a behavior is to be selected by the scheduler, it composes module behaviors on-the-fly. Thus, a composition may be done only once (after modules are first plugged together), or each time they are needed. The latter option has an advantage of accounting for dynamic module changes. Thus, the system may complete the FIG. 2 sequence each time a machine behavior is selected. It may be prohibitive to do so due to the time-consuming computations. However, this may be a more efficient approach in specific circumstances.

In block 104, the afore-noted, overall behavior is advantageously modeled in a format similar to that associated with the individual module behavior noted above. Per distinct overall behavior, the system provides an output description (for behavior identification), resource and timing constraints (for sequencing), and data comprising an itinerary (for subsequent control of machine operations).

Next, a portion of machine behavior information is advantageously compiled for efficient use in a matching scheduler algorithm at which point the system progresses to block 106. By way of example, a compilation of potential interactions of timing and resource constraints may be made to a finite-state machine. An example of finite-state machine scheduling may be found in the co-owned U.S. patent application Ser. No. 08/426,207, filed Apr. 21, 1995, now U.S. Pat. No. 5,504,568, entitled PRINT SEQUENCE SCHEDULING SYSTEM FOR DUPLEX PRINTING APPARATUS, the contents of which are incorporated herein by reference. At block 108, a full set of compiled behaviors has been obtained.

Lastly, at block 110, an output description of machine behaviors is used by a generic scheduler to identify behaviors that will produce an output document given the original constraints (either in original or compiled form). These are used to find a correct timing for each particular behavior's operation and itineraries which are used to initiate necessary operations of the modules B.

While the foregoing description is provided by way of preferred embodiment, it will be appreciated that not all of the steps are required to provide a usable system. For example, only a portion of all components need be modeled and compilation of all constraints need not be accomplished.

With the system described above, modular ("plug-and-play") scheduling of print engine modules is facilitated. The system also allows for reuse of scheduling software for a wide range of configurations. It also provides for automating all steps but that of obtaining the initial description of the discrete modules forming the machine and for development of the generic scheduling algorithms.

Figure 3:
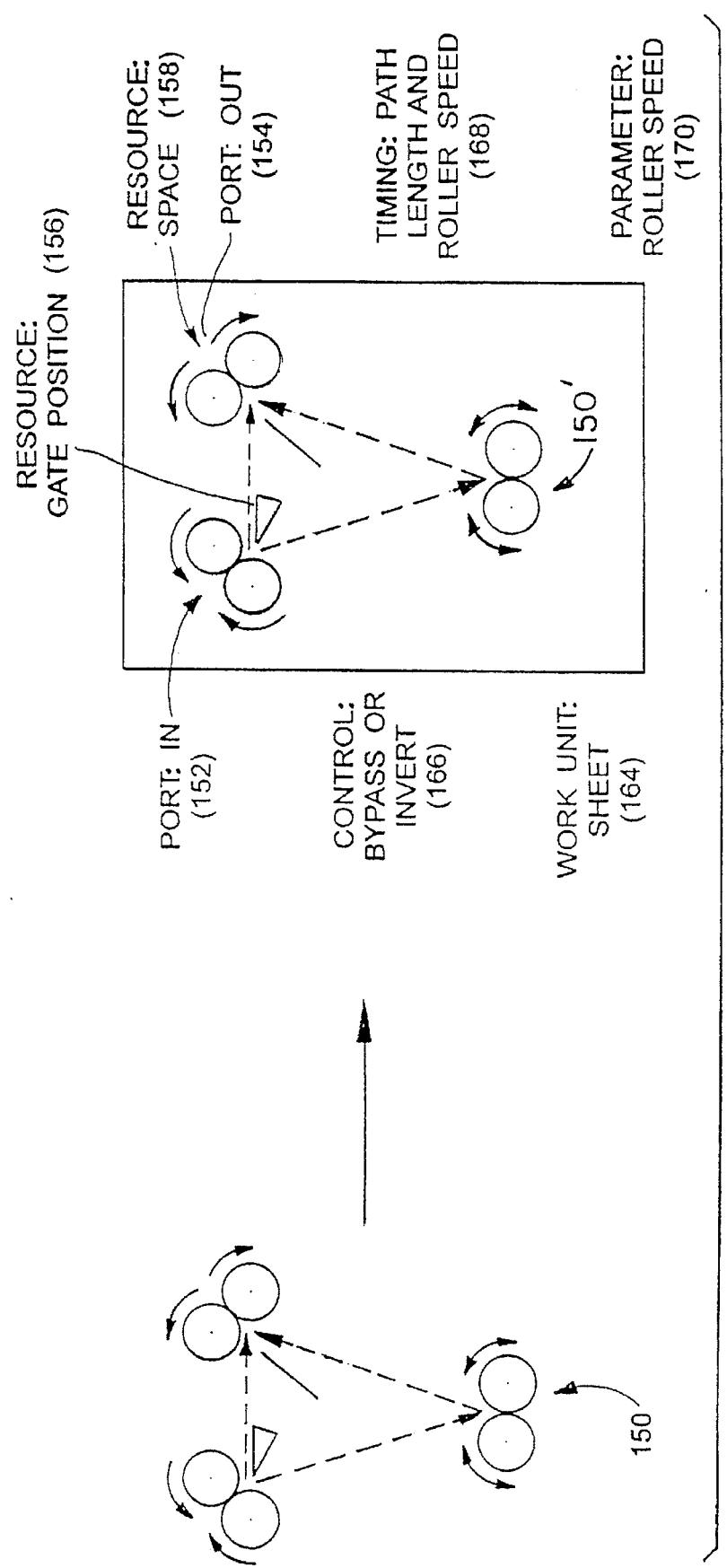
FIG. 3 provides a diagram of a representative, generic description of a print machine component as used in connection with the subject, automated scheduling and configuration of the subject invention.

Turning now to FIG. 3, a particular system for modeling component behavior will be described. The particular system of the preferred embodiment is for a description of print engine component behavior for print engine analysis, simulation, and scheduling. As noted above, the basic, generic description method is equally applicable to various other modular systems.

In the subject description method, structure and behavior of components is described in terms of capabilities (potential operations) for which constraints on work units, timings, and resources are stated. This modeling system enables structural and behavioral composition of components for analysis and simulation of component interactions in print engines. The system is particularly applicable for scheduling operation of modular print engines.

With the subject scheme, one may describe print engine components such that print engines fabricated therefrom may be described by composing component descriptions. Further, various applications may be performed automatically on resulting print engine description. This enables one to automatically use such information for analysis, simulation, scheduling, and related print engine applications. In the illustrated example of FIG. 3, descriptions associated with an inverter 150, analogous to the inverter 30 of FIG. 1, are provided with model 150'. Components of a modeled structure and behavior are determined by both the physics of the component itself, as well as an application context in which a model is used.

In the system, a structure model of a component is defined as consisting of its physical interface, software interface and internal resources. For example, a physical interface is an input port 152 along which work units (sheets) enter and a port 154 from which said work units exit. Associated software interface functions primarily for control commands and parameters. Internal resources are defined as objects needed to perform a particular behavior, where multiple uses of the object by repeated execution of the behavior is restricted. By way of example in FIG. 3, a resource is defined as the position of an associated gate 156. Another example of a resource is a space 158 between opposing output rollers 160 of the inverter 150, particularly illustrated at 150'. Here, as with most points of the paper path, there is sufficient space for only one sheet at any single point in time. Thus, the space 158 is defined as a resource.

A behavior model of a component is utilized to describe capabilities of the particular component in terms of how the component may work on work units moving through the component. Further, the behavior dictates what constraints must be observed when performing the associated behavior.

A component capability is defined as consisting of a description of work units and a transformation of work units, timed events like the input and output of a work unit, of resource allocations for this transformation, and of constraints on the timing of such events and resource allocations. Work units are advantageously described in terms of their attributes. Restrictions and transformations of work units are advantageously described in terms of constraints on their attributes.

In FIG. 3, some additional model descriptions are provided. These include a description associated with a particular work unit, such as a sheet illustrated at 164. A control situation, such as whether or not to bypass the inverter 150 or utilize it for inversion is illustrated at 166. A timing parameter, such as a specification of path length and roller speed is provided at 168. By way of example, associated timing constraints are suitably obtained using a formula based on path length and roller speed, e.g., time out may be defined as time in plus path length, divided by roller speed. Certain values are also suitable parameters of the model, e.g., the path length of a given inverter is fixed, while roller speed may vary and may therefore be set by the environment with respect to a model that is used. A roller speed parameter is illustrated at 170.

By way of particular example, the following listing provides a suitable model of an inverter as depicted in connection with FIG. 3:

```
Component inverter(length: Millimeters, speed: MillimetersPerSecond) Has
    EntryPorts in: Sheet;
    ExitPorts out: Sheet;
    Resources inR, outR: Signal; gateR: State({Bypassing,Inverting}, Bypassing);
    Variables s, s_in, s_out: Sheet; t_in, t_out, t_gate: Interval;
    Capability bypass(t_in) Is
        in.input(s, t_in);
        out.output(s, t_out);
        inR.allocate(1, t_in);
        outR.allocate(1, t_out);
        gateR.allocate(Bypassing, t_gate);
        t_in.START + length/speed = t_out.START;
        t_in.DURATION = t_out.DURATION;
        t_gate.START = t_in.START;
        t_gate.END = t_out.END
    End bypass;
    Capability invert(t_in) Is
        in.input(s_in, t_out);
        out.output(s_out, t_out);
        inR.allocate(1, t_in);
        outR.allocate(1, t_out);
        gateR.allocate(Inverting, t_gate);
        s_out = s_in with
                        {SHEET.ORIENTATION=
                            Rotate(Y, 180, s_in.SHEET, ORIENTATION)};
        t_in.START + length/speed +
        SheetLength(s_in.SHEET.SIZE)/Speed=t_out.START;
        t_in.DURATION = t_out.DURATION;
        t_gate.START = t_in.START;
        t_gate.END = t_out.END
    End invert
End inverter
```

This model declares two parameters (length and speed), one entry port (in), one exit port (out), three resources (inR, outR and gateR, of types Signal respectively State), and six variables (of types Sheet and Interval). Then the model defines two capabilities (bypass and invert). For capability bypass, it is defined that a sheet s enters at time t_in and exits at time t_out, that allocations in all three resources are made at the respective intervals t_in, t_out and t_gate, and that various timing constraints reflecting the traveling time from entry to exit hold between the intervals. Capability invert is defined similarly, except that the sheet changes its orientation by 180° (rotated around the y axis), and that the traveling time is longer (proportional to the sheet's size). Thus, it will be appreciated that a complete and functional description of any component may be similarly provided.

With the disclosed modeling system, a component structure is described without relying on any reference to descriptions of or interactions with other components. Such component behavior is described on one work unit without other units. Further, the disclosed modeling system enables automatic behavioral composition of component capabilities for generic and incremental analysis, simulation, and scheduling of print engines. This description format allows automatic structural composition of component models to models describing connected components (for example, print engine modules).

Conversely, earlier approaches had their capabilities and constraints expressed in terms of both specific interactions between components and interactions between sequences of sheets or images. This renders them more difficult to define, renders them non-reusable, and further renders them non-compositional. The system modeling format allows for the automatic configuration, optimization, and scheduling described above.

As will be appreciated from the foregoing, scheduling a print engine is, to a large part, a scheduling of associated resources. To do this effectively, one must model the resources used by a print engine operation such that information may be used for incremental scheduling of valid sequences of those operations. Besides being applicable to a wide range of print engine operations, resources may also suitably serve as generic interfaces between a scheduler and the rest of the print engine control software for purposes of communicating changes in the machine.

Components of a machine, such as a print engine, will usually require resources to perform their capabilities. By way of example particular to a printing machine, a resource may be space on a belt, a gate that must be in a certain position, or some element that is being placed for multiple or overlapping uses. One may view the capacity of a bin of paper as being one instance of such multiple or overlapping uses.

Allocations of resources are suitably modeled explicitly as a part of a description of a component's behavior. As used herein, resource allocation is defined as a specification of a resource requirement, together with a time interval during which a particular resource is required. Again, by way of example, an imaging capability requires space on a photoreceptor belt for a certain amount of time. As another example, an invert capability requires an inverter gate to be in a correct position while a sheet is being inverted.

As defined herein, a resource requirement is chosen to depend on a particular type of resource. Possible resource types include such items as Boolean resources (resources which are either used or not used), enumerated or state resources (which are placed in one of the available states), capacity resources (where concurrent uses add up), and the like. Such resource types are advantageously described generically by resource constraints. Resource constraints, themselves, determine consistency for multiple allocations for the same resource.

By way of example, Boolean resource allocations, such as space on a belt, must not overlap in time. Conversely, state resource allocations may overlap if they require the same state. Capacity resource allocations may overlap if the sum of the requirements never exceeds the given capacity. Such resource types may be extended easily by changing or adding to the afore-noted resource constraints.

Time intervals of resource allocations may suitably be connected by interval constraints. As defined herein, a resource constraint system and an interval constraint system are orthogonal to one another. A description of resource allocations and timing constraints fit well into a compositional modeling paradigm for scheduling.

Figure 4:
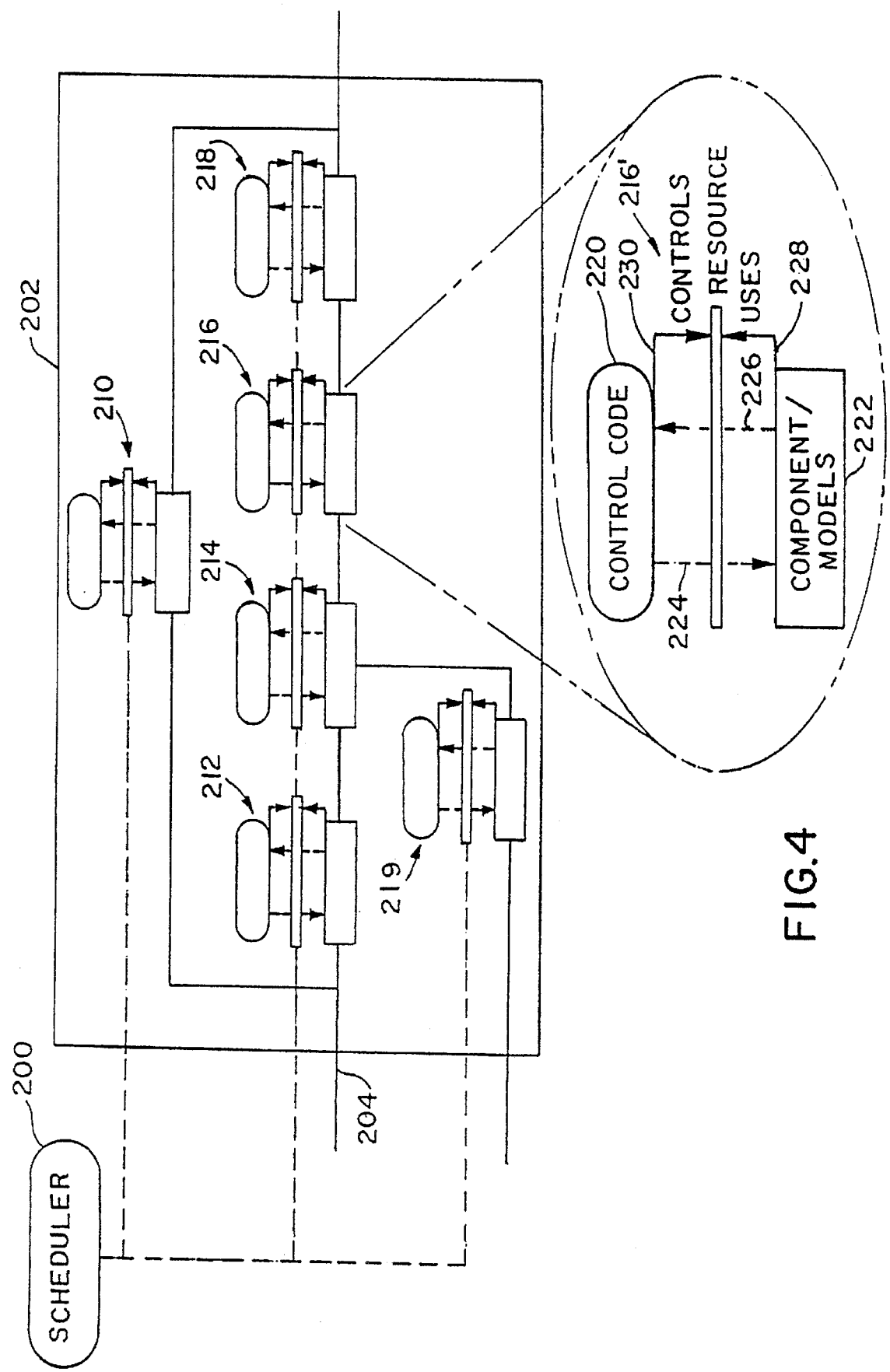
FIG. 4 is a block diagram depicting interaction of scheduler and control code using resources as provided in the subject invention.

Once all components have been fully modeled, a print engine will ultimately be moved to a run time state. Turning particularly to FIG. 4, evidenced therein is a scheduler 200 which is in data communication with a representative print engine module 202. The print engine module 202 is, in turn, comprised of several components, each using resources selectively disposed along a paper/image path 204. Such resources are exemplified by components 210, 212, 214, 216, 218, and 219 (respectively, their resources). Each of these resources is suitably described in the same fashion, a representative one of which is detailed at 216'. A system includes a control code portion 220, a component/models portion 222, and various communication paths. The control path 224 allows for passing of control commands from the control code portion 220 to the component/models portion 222. Similarly, a sensor path 226 allows for communication of sensor data in the opposite direction. A path 228 represents the scheduled use of resources by the component; more precisely, it stands for the communication of knowledge from the model 222 describing the component to the scheduler, where this knowledge is used to schedule correct uses of the resource. A path 230 allows for control and sensor information to be similarly communicated to the scheduler 200.

At run time, when scheduling operations, the scheduler 200 instantiates the interval such that the corresponding allocations for the same resources satisfy required resource constraints. This is also suitably done incrementally by keeping track of past resource allocations.

During a normal operation the scheduler 200 takes into account only its own allocations. To do this, it uses its model of the system to predict a use of resources for operations it has scheduled.

That system is also readily adaptable to a real-time, reactive environment wherein resources sometimes become unavailable or become restricted to a subset of the normal capacity. Such variations in real hardware are typically monitored by a module's control software disposed, in the example, in the control code portion 220. It will be appreciated that in earlier systems, the control software was required to have a special interface to the scheduler in order to communicate deviations between modeled and real hardware or to allow for a scheduler to have access to data of the controlled software.

Resource management within the scheduler 200 is suitably made accessible to an environment. More specifically, it is made available to the component control code as represented by 220. As with the scheduler 200, the control code 220 is then suitably enabled to make for calculations in such resources to reflect changes in the hardware. In turn; this enables the scheduler 200 to automatically take system changes into account.

In the foregoing sense, models are used to define a default behavior (resource allocations) of component capabilities. Meanwhile, control code itself dynamically adapts that behavior to reflect a current situation. This is suitably extended even further if an environment is allowed to change the resource constraints. In general, this means that control software is seen as controlling resources (starting from a default definition), while a scheduler is using those resources.

In an actual on-line implementation, a scheduler will advantageously make such future allocations automatically and take them into account. When the scheduler looks ahead to make further allocations, allocations are suitably tagged with different priorities depending on whether they come from the scheduler 200 (respectively models 222) or from the control code 220. With this, any allocations by the scheduler that are inconsistent with allocations by an environment are suitably identified automatically and may be redone.

This invention has been described with reference to the preferred embodiment. Obviously, modifications and alterations will occur to others upon a reading and understanding of the specification. It is intended that all such modifications and alterations be included insofar as they come within the scope of the appended claims or the equivalents thereof.

Having thus described the invention, it is now claimed:

1. A system for modelling print engine resources for scheduling of printing tasks comprising:

a plurality of components forming at least one print engine module, at least one of the components being a physical element of the print engine module, and each of the components being described independent of reference to descriptions of or interactions with other components;

resource data acquisition means for acquiring resource data relative to each component, the resource data including, resource availability data representative of all resources available to an associated component, at least one of the resources occupying a physical space within the print engine, resource allocation data representative of a resource requirement and a required time interval during which an associated resource is required, resource constraint data representative of acceptability of multiple allocations of a same resource;

composing means for composing component descriptions which include the acquired resource data relative to the components, and for composing an overall print engine resource description, so as to obtain an overall print engine description; and means for communicating the composed component descriptions, including the acquired resource data relative to the components, to an associated generic scheduler which is configured without component specific information, whereby the associated generic scheduler is adapted to schedule operation of each component in order to obtain overall print engine resources for scheduling of printing tasks.

2. The system for modelling print engine resources for scheduling of printing tasks of claim 1 wherein the resource data acquired by the resource data acquisition means further includes resource type data including at least one of boolean resource information, enumerated resource information, and capacity resource information.

3. The system for modelling print engine resources for scheduling of printing tasks of claim 2 wherein the resource data acquired by the resource data acquisition means further includes interval constraint information representative of logical relationships between time intervals of the resource allocation data.

4. The system for modelling print engine resources for scheduling of printing tasks of claim 3 wherein each component includes a storage for storing the resource data.

5. The system for modelling print engine resources for scheduling of printing tasks of claim 4 wherein each component includes means for selectively communicating resource data from its storage to the resource data acquisition means.

6. The system for modelling print engine resources for scheduling of printing tasks according to claim 1 wherein the associated generic scheduler is configured to operate with components and modules added to the system, having functions and capabilities different from the components and at least one module originally in the system.

7. The system for modelling print engine resources for scheduling of printing tasks according to claim 1 wherein the resource of an associated component is configured to provide a communication path between the associated component and the generic scheduler, whereby dynamic operation is achieved.

8. A method of modelling print engine resources for scheduling of printing tasks comprising:

retrieving, from components of a print engine, resource availability data representative of all resources available thereto, at least one of the components being a physical element of the print engine, each of the components being described independent of reference to descriptions of or interactions with other components;

communicating retrieved resource availability data to an associated generic scheduler, the associated generic scheduler configured without component specific information;

retrieving, from each component, resource allocation data representative of a resource requirement and a required time interval during which an associated resource is required;

communicating retrieved resource allocation data to the associated generic scheduler;

retrieving, from each component, resource constraint data representative of acceptability of multiple allocations of a same resource;

communicating retrieved resource constraint data to the associated generic scheduler; and composing each of the retrieved and communicated resource availability data, resource allocation data, and resource constraint data to obtain an overall model of a print engine, whereby the associated generic scheduler is adapted to schedule printing tasks of each component in order to obtain overall print engine resources for scheduling of printing tasks.

9. The method of modelling print engine resources for scheduling of printing tasks of claim 8 further comprising the steps of:

retrieving, from each component, resource type data inclusive of at least one of boolean resource information, enumerated resource information, and capability resource information; and communicating retrieved resource type data to the associated generic scheduler.

10. The method of modelling print engine resources for scheduling of printing tasks of claim 9 further comprising the steps of:

retrieving, from each component, interval constraint information representative of logical relationships between time intervals of the resource allocation data; and communicating retrieved interval constraint information to the associated generic scheduler.

11. The method of modelling print engine resources for scheduling of printing tasks of claim 10 wherein each step of retrieving includes the step of retrieving from a data storage associated with one component.

12. The method of modelling print engine resources for scheduling of printing tasks of claim 11 further comprising the step of selectively communicating data from each data storage to the associated generic scheduler.

13. The method for modelling print engine resources for scheduling of printing tasks according to claim 8 wherein the resource of an associated component is configured to be a communication path between the associated component and the generic scheduler, whereby dynamic operation can be achieved.

14. A method of modelling machine resources for scheduling of machine tasks comprising:

retrieving, from components of a machine, resource availability data representative of all resources available thereto, at least one of the components being a physical element of the machine, each of the components being described independent of reference to descriptions of or interactions with other components;

communicating retrieved resource availability data to an associated generic scheduler, the associated generic scheduler configured without component specific information;

retrieving, from each component, resource allocation data representative of a resource requirement and a required time interval during which an associated resource is required;

communicating retrieved resource allocation data to the associated generic scheduler;

retrieving, from each component, resource constraint data representative of acceptability of multiple allocations of a same resource;

communicating retrieved resource constraint data to the associated generic scheduler; and composing each of the retrieved and communicated resource availability data, resource allocation data, and resource constraint data to obtain an overall model of a machine, whereby the associated generic scheduler is adapted to schedule tasks of each component in order to obtain overall machine resources for scheduling of machine tasks.

15. The method of modelling machine resources for scheduling of machine tasks according to claim 14 wherein the resource of an associated component is configured to provide a communication path between the associated component and the associated generic scheduler, whereby dynamic operation is achieved.

16. A system for modelling machine resources for scheduling of machine tasks comprising:

a plurality of components forming at least one machine module, at least one of the components being a physical element of the machine module, and each of the components being described independent of reference to descriptions of or interactions with other components;

resource data acquisition means for acquiring resource data relative to each component, the resource data including, resource availability data representative of all resources available to an associated component, at least one of the resources occupying a physical space within the print engine, resource allocation data representative of a resource requirement and a required time interval during which an associated resource is required.

resource constraint data representative of acceptability of multiple allocations of a same resource;

composing means for composing component descriptions which include the acquired resource data relative to the component, and for composing an overall machine resource description, so as to obtain an overall machine description; and means for communicating the composed component descriptions, including the acquired resource data relative to the components, to an associated generic scheduler which is configured without component specific information, whereby the associated generic scheduler is adapted to schedule operation of each component in order to obtain overall machine resources for scheduling of machine tasks.

17. The system for modelling machine resources for scheduling of machine tasks according to claim 16 wherein the associated generic scheduler is configured to operate with components and modules added to the system, which have functions and capabilities different from the components and at least one module originally in the system.

18. The system for modelling machine resources for scheduling of machine tasks according to claim 16 wherein the resource of an associated component is configured to be a communication path between the associated component and the associated generic scheduler, whereby dynamic operation can be achieved.

* * * * *